United States Patent [19]

Howarth

[11] 4,422,649

[45] Dec. 27, 1983

[54] STIRLING ENGINE PISTON RING

[75] Inventor: Roy B. Howarth, Clifton Park, N.Y.

[73] Assignee: Mechanical Technology Incorporated, Latham, N.Y.

[21] Appl. No.: 354,020

[22] Filed: Mar. 2, 1982

[51] Int. Cl.³ .............................................. F16J 9/00
[52] U.S. Cl. ....................................... 277/75; 277/216
[58] Field of Search ................... 277/74, 75, 27, 216, 277/214

[56] References Cited

U.S. PATENT DOCUMENTS

| | | | |
|---|---|---|---|
| 1,853,937 | 4/1932 | Solenberger | 277/75 |
| 3,623,739 | 11/1971 | Sueahara | 277/75 |
| 3,917,290 | 11/1975 | Geffroy | 277/75 |
| 4,174,843 | 11/1979 | Arena et al. | 277/27 |

FOREIGN PATENT DOCUMENTS 1366961 6/1964 France .................. 277/75

Primary Examiner—Robert I. Smith
Attorney, Agent, or Firm—Kane, Dalsimer, Kane, Sullivan & Kurucz

[57] ABSTRACT

A piston ring design for a Stirling engine wherein the contact pressure between the piston and the cylinder is maintained at a uniform level, independent of engine conditions through a balancing of the pressure exerted upon the ring's surface and thereby allowing the contact pressure on the ring to be predetermined through the use of a preloaded expander ring.

6 Claims, 2 Drawing Figures

STIRLING ENGINE PISTON RING

The Government of the United States of America has rights in this invention pursuant to Contract No. DEN 3-32 awarded by U.S. Department of Energy.

FIELD OF THE INVENTION

The present invention relates to an improved piston ring design, particularly for use in a Stirling engine.

BACKGROUND OF THE INVENTION

Present Stirling engine designs have highly pressurized gas, such as hydrogen, utilized as the working gas. The basic principle of Stirling engine operation is the utilization of a piston disposed between a high pressure and low pressure regions which results in the movement of the piston which provides a work output. In an unlubricated Stirling engine, a non-metallic material is typically used for the piston ring or rings to maintain a seal between the two pressure regions. Since such material normally has a low modulus of elasticity, in order to maintain contact between the ring and the cylinder wall for sealing purposes, a radial force must be applied to the ring. This has been usually achieved by connecting the inner surface of the piston ring with the high pressure gas in the engine. Some designs provide additional loading by various forms of internal expanders. However, with such arrangements, the contact pressure between the ring and the cylinder will vary during each engine cycle and with engine operating conditions. This varying contact pressure leads to inefficient sealing of the piston in the cylinder which is necessary for effective operation.

In addition, while it is important to maintain contact for sealing purposes, it is also important to limit and control the contact pressure to reduce the friction and wear of the rings.

SUMMARY OF THE INVENTION

It is a principal object of the invention to provide a piston ring having a contact pressure with the cylinder which is independent of changes in the engine operation and condition.

The present invention provides for a piston ring design wherein contact pressure is maintained at a uniform level, independent of the gas pressure in the engine. This is accomplished by providing an elastomeric seal which isolates the inner surface of the piston ring from the high pressure gas and maintains contact between the piston ring and the low pressure side of a piston ring groove. Radial holes are provided in the mid-plane of the piston ring and communicate the mean pressure in the leakage path between the piston ring and the cylinder, to the inner surface of the piston ring. By such an arrangement, the pressure forces acting on the inner and outer surfaces of the piston ring are balanced. The contact pressure between the ring and the cylinder is now maintained by an expander ring which provides the required preload.

This advantageously allows for a control of the preload and contact pressure and provides more flexibility in the ring design. Also, it is possible to improve the piston ring seal by increasing the length of the leakage path between the ring and the cylinder without increasing friction and wear.

BRIEF DESCRIPTION OF THE DRAWINGS

These and other objects and advantages will be realized by the present invention, the discussion of which should be taken in conjunction with the drawings wherein.

DETAILED DESCRIPTION OF THE PREFERRED EMBODIMENT

Figure 1:
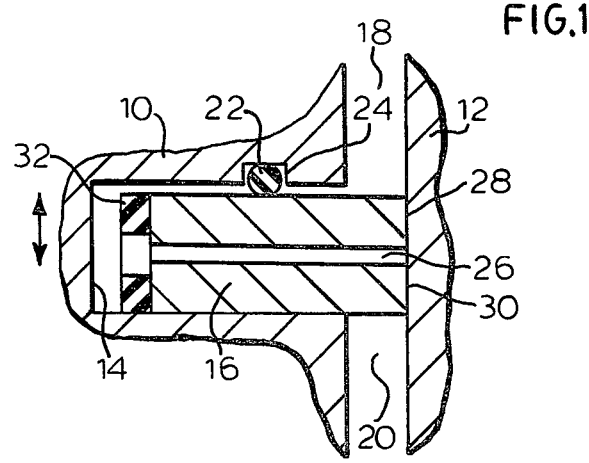
FIG. 1 is a partial sectional side view of a piston ring mounted on a piston incorporating the teachings of the present invention.

With reference to FIG. 1, there is depicted a side sectional view of a reciprocating cylinder piston 10 disposed in a cylinder 12 of a Stirling engine. The piston 10 is provided an annular notch 14 disposed about its outer surface which serves as a receptacle for a piston ring 16, shown disposed therein and in contact with the cylinder 12. The ring 16 provides for sealing the piston 10 in the cylinder during its reciprocal movement therein. The ring 61 is positioned between a high pressure region in the cylinder and a low pressure region, generally indicated 18 and 20 respectively, and a working gas, typically hydrogen, is located in these region.

An elastomeric seal 22 is provided and maintained in a notch 24, formed perpendicular to annular notch 14 on the high pressure side of the ring 16. This seal 22 serves to isolate the inner surface of the piston ring 16, and bias the low pressure side of the ring 16 into contact with an adjacent side of notch 14.

Throughout the circumference of the ring 16 is a plurality of radial openings 26 which pass through its mid-plane and communicate a mean pressure on a leakage path of pressure between the ring surfaces 28 and 30 about said openings and in contact with the cylinder 12, with the inner surface of the piston ring 16. This provides for a balancing of the pressure forces acting on the inner surface and the outer surface of the piston ring 16. Contact between the ring 16 and the cylinder 12 is now maintained by an expander ring 32 positioned behind the ring 16 biasing the ring 16 into contact with the cylinder 12. This expander ring 32 may take the form of a spring or any other type suitable for purpose.

Accordingly, the sealing provided by ring 16 is determined by the loading provided by the expander ring 32 which is predetermined and remains constant, independent of changes in the engine conditions.

Figure 2:
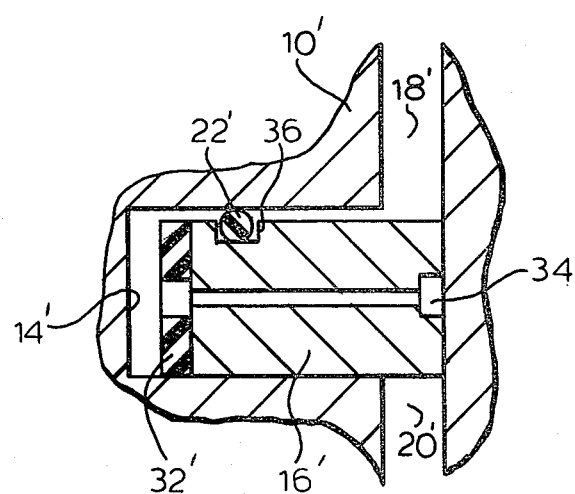
FIG. 2 is a partial sectional side view of a piston ring mounted on a piston similar to that of FIG. 1, however modified and incorporating the teachings of the present invention.

Turning now to FIG. 2, another embodiment of the invention is shown with parts similar to those in FIG. 1 similarly numbered and designated with a "'". In this embodiment, the average pressure from all of the radial opening 26 is provided by a circumferential groove 34 in ring 16' providing communication between the openings 16 with the peripheral surfaces 28' and 30' providing sealing. Note that as an alternate to that shown in FIG. 1, seal 22' may be maintained in a notch 36 formed in the piston ring 16' rather than on the piston 10 as shown in FIG. 1.

Thus by the aforenoted, the objects and advantages of the present invention are realized and although a preferred embodiment has been disclosed and described in detail herein, its scope should not be limited thereby, rather its scope should be determined by that of the appended claims.

What is claimed is:

1. In combination a piston, cylinder and sealing ring for use in providing a seal between the piston and the cylinder in which is contained a high pressure region on one side of the ring and a low pressure region on the opposite side, said ring comprising:
   an inner and outer surface, said outer surface having at least two sides, one of which is exposed to high pressure, the other side of which is exposed to low pressure;
   a contact surface on said outer surface engageable with the cylinder;
   means isolating said inner surface from the high pressure;
   a leakage path between the high and low pressure coupled to means capable of communicating a mean pressure to the inner surface of the ring so as to balance pressure forces acting on the inner and outer surfaces; and
   means biasing said contact surface into engagement with the cylinder to provide a seal therebetween.

2. The invention in accordance with claim 1 wherein the communicating means comprises radial openings through said sealing ring from the inner surface to the outer surface.

3. The invention in accordance with claim 2 which includes a circumferential groove about the sealing ring and connecting the radial openings so as to communicate an average pressure to the inner surface.

4. The invention in accordance with claims 1, 2 or 3 wherein said biasing means comprises an expander ring disposed between the sealing ring and said piston to provide a predetermined loading of the sealing ring into engagement with the cylinder.

5. The invention in accordance with claim 4 which includes a piston having a notch about its circumference in which the expander ring and the sealing ring are maintained.

6. The invention in accordance with claim 5 wherein said isolating means is an elastomeric seal in contact with one side of said outer surface biasing the opposite side into engagement with the notch.

* * * * *